US012591818B2

(12) United States Patent
Tirupathi et al.

(10) Patent No.: US 12,591,818 B2
(45) Date of Patent: Mar. 31, 2026

(54) FORECASTING AND MITIGATING CONCEPT DRIFT USING NATURAL LANGUAGE PROCESSING

(71) Applicant: INTERNATIONAL BUSINESS MACHINES CORPORATION, Armonk, NY (US)

(72) Inventors: Seshu Tirupathi, Dublin (IE); Amadou Ba, Navan (IE); Marco Luca Sbodio, Castaheany (IE); Yufang Hou, Dublin (IE); Venkata Sitaramagiridharganesh Ganapavarapu, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 18/171,704

(22) Filed: Feb. 21, 2023

(65) Prior Publication Data
US 2024/0281722 A1     Aug. 22, 2024

(51) Int. Cl.
*G06N 20/20* (2019.01)
(52) U.S. Cl.
CPC .................................. *G06N 20/20* (2019.01)
(58) Field of Classification Search
CPC ..................................................... G06N 20/20
See application file for complete search history.

(56) References Cited

U.S. PATENT DOCUMENTS

| | | | |
|---|---|---|---|
| 8,285,619 B2 | 10/2012 | Herz | |
| 2019/0147357 A1* | 5/2019 | Erlandson | G06N 3/0455 |
| | | | 706/12 |
| 2020/0242485 A1 | 7/2020 | Tenyenhuis | |

(Continued)

FOREIGN PATENT DOCUMENTS

CN     103778215 B     8/2016

OTHER PUBLICATIONS

Article entitled "Addressing Event-Driven Concept Drift in Twitter Stream: A Stance Detection Application", by Bechini et al., dated May 25, 2021 (Year: 2021).*

(Continued)

*Primary Examiner* — Mahesh H Dwivedi
(74) *Attorney, Agent, or Firm* — Teddi E. Maranzano

(57) ABSTRACT

An embodiment for automatically forecasting and mitigating concept drift in machine learning models using natural language processing. The embodiment may automatically detect features and variables considered by a target machine learning model. The embodiment may automatically store and update a configurable corpus of relevant documents pertaining to a domain of the target machine learning model. The embodiment may automatically extract event types and corresponding time stamps from the configurable corpus of relevant documents. The embodiment may automatically correlate the extracted event types with drift detection probabilities to detect expected concept drift in the target machine learning model at a given timestamp. The embodiment may automatically generate an ensemble of replacement models based on probabilities derived from a historical database of models including corresponding keys given by event types. The embodiment may automatically retrain or replace the target machine learning model at the given timestamp.

20 Claims, 6 Drawing Sheets

(56)          References Cited

U.S. PATENT DOCUMENTS

| | | | |
|---|---|---|---|
| 2020/0311615 A1 | 10/2020 | Jammalamadaka | |
| 2021/0224696 A1* | 7/2021 | Nasr-Azadani | G06N 5/01 |
| 2021/0319174 A1 | 10/2021 | Raj | |
| 2022/0027797 A1* | 1/2022 | Tian | G06N 5/04 |
| 2023/0252347 A1* | 8/2023 | Koulierakis | G03F 7/706841 |
| | | | 706/10 |
| 2023/0376825 A1* | 11/2023 | Ganapavarapu | G06N 20/00 |
| 2024/0259273 A1* | 8/2024 | Neogi | H04L 41/147 |
| 2024/0370731 A1* | 11/2024 | Byun | G06N 3/0464 |

OTHER PUBLICATIONS

Article entitled "Learning under Concept Drift: A Review", by Lu et al., dated Apr. 13, 2020 (Year: 2020).*
Article entitled "Distributed Incremental Machine Learning for Big Time Series Data", by Salwala et al., dated 2022 (Year: 2022).*
Article entitled "An Overview on Concept Drift Learning", by Iwashita et al., dated Dec. 10, 2018 (Year: 2018).*
Agudelo-Espana, et al., "Bayesian Online Prediction of Change Points", arXiv:1902.04524v2[cs.LG], Jun. 24, 2020, 15 Pages.
Beckmann, "Stock Price Change Prediction Using News Text Mining", COPPE Instituto Alberto Luiz Coimbra de Pos-Graduacao e Pesquisa de Engenharia UFRJ, Research Gate, Jan. 2017, 155 Pages. https://www.researchgate.net/publication/313473231.
Chapman, et al., "Novel Methods for the Detection and Prediction of Changepoints", Lancaster University, Dec. 2018, 181 Pages.
Duygu-Kabakci-Zorlu, "Monitoring & Testing Service", Dublin-Research-Lab/mat-service, [Accessed from Internet Feb. 7, 2023], 6 Pages. https://github.ibm.com/Dublin-Research-Lab/mat-service.

Hirade, et al., "Ensemble Learning for Change-Point Prediction", 21st International Conference on Pattern Recognition (ICPR 2012) Nov. 11-15, 2012, 4 pages.
Le, et al., "Automated Software Vulnerability Assessment with Concept Drift", arXiv:2103.11316v1 [cs.SE], Mar. 21, 2021, 13 Pages.
Lee, et al., "On the Importance of Text Analysis for Stock Price Prediction", European Language Resources Association (ELRA), Proceedings of the Ninth International Conference on Language Resources and Evaluation (LREC'14), May 2014, 8 Pages. https://aclanthology.org/L14-1048/.
Muthukumar, et al., "A Stochastic Time Series Model for Predicting Financial Trends using NLP", arXiv:2102.01290v1 [q-fin.CP], Feb. 2, 2021, 16 Pages.
Proskuryakov, et al., "Forecasting the change in the parameters of time series and continuous functions", Elsevier, Science Direct, 3rd International Conference "Information Technology and Nanotechnology", ITNT-2017, Apr. 25-27, 2017, 12 pages.
Wikipedia, "Concept drift", Wikipedia.com, [Accessed on Feb. 7, 23], 9 pages. https://en.wikipedia.org/wiki/Concept_drift.
Xu, et al., "Document-level Event Extraction via Heterogeneous Graph-based Interaction Model with a Tracker", arXiv:2105.14924v1[cs.CL], May 31, 2021, 14 Pages.
Zhang, et al., "ASER: A Large-scale Eventuality Knowledge Graph", arXiv, IW3C2 (International World Wide Web Conference Committee), Creative Commons CC-BY 4.0, Jan. 25, 2020, 11 Pages. arXiv:1905.00270v3[cs.AI].
Zhao, et al., "Predicting Concept Drift via Dynamic Naive Bayes", 2017 IEEE International Conference on Big Data (Bigdata), Downloaded from IEEE XPlore on Feb. 13, 2023, 6 Pages.

* cited by examiner

100

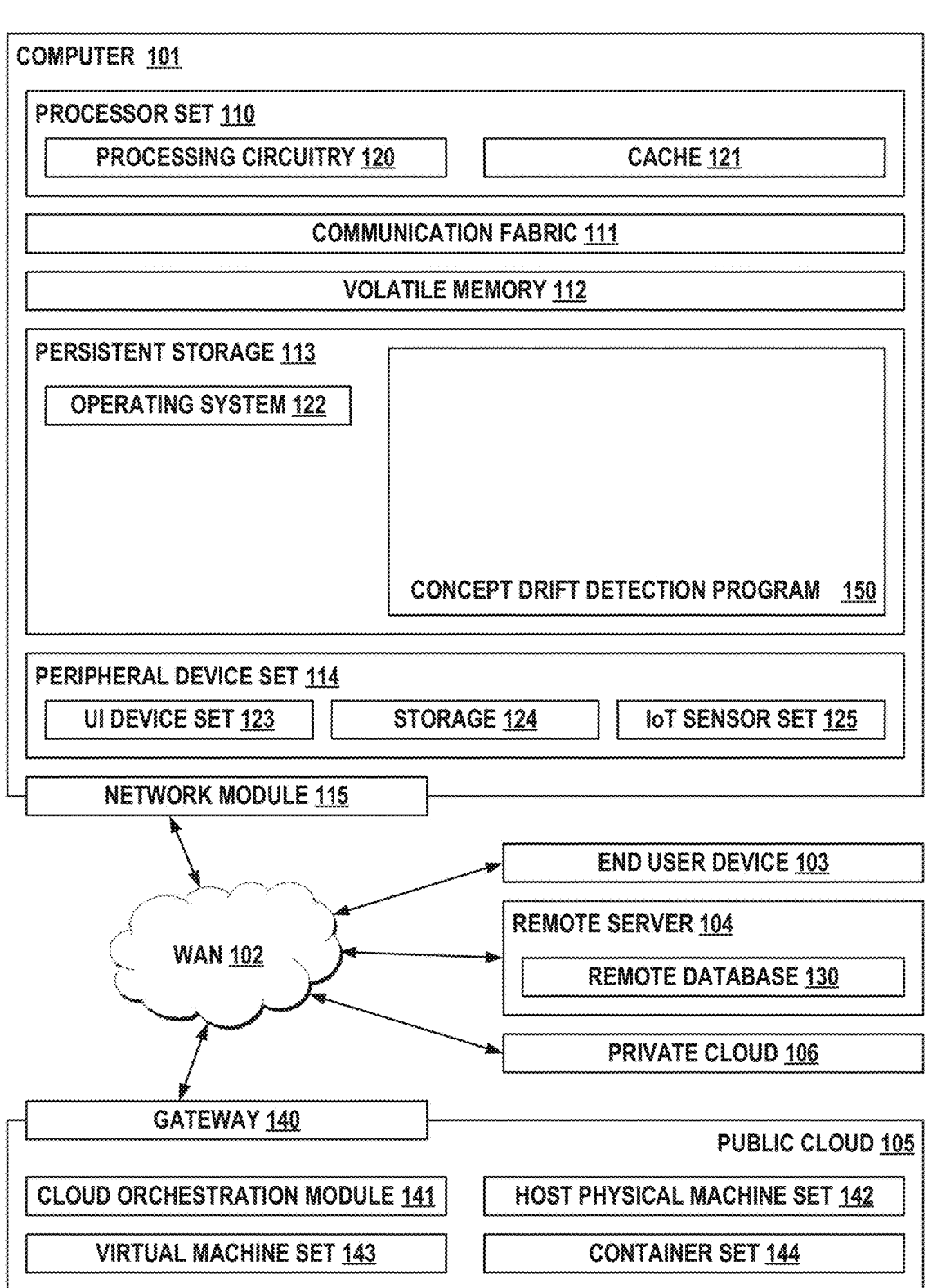

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

CONCEPT DRIFT DETECTION PROGRAM     150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

Figure 1

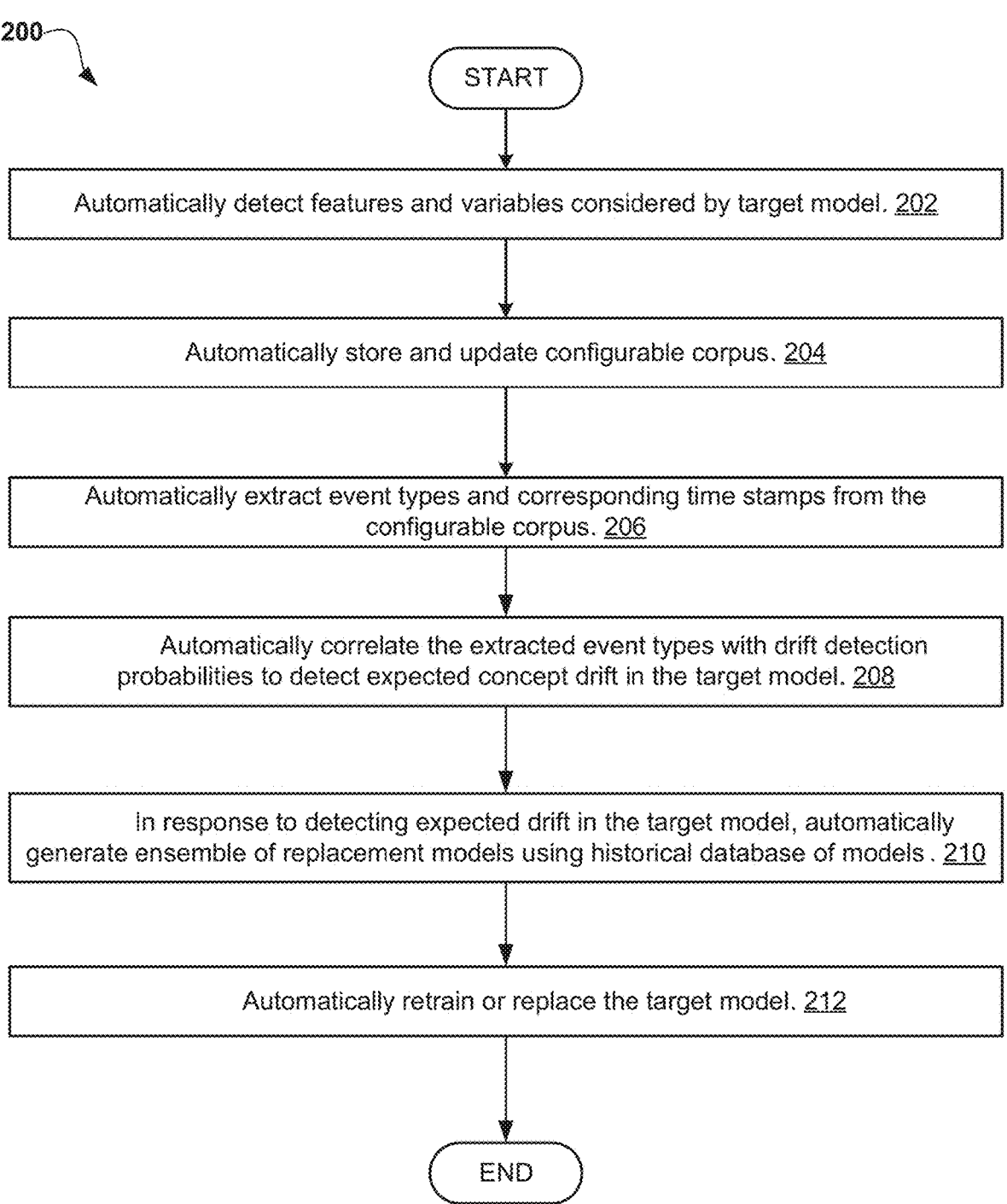

200

START

Automatically detect features and variables considered by target model. 202

Automatically store and update configurable corpus. 204

Automatically extract event types and corresponding time stamps from the configurable corpus. 206

Automatically correlate the extracted event types with drift detection probabilities to detect expected concept drift in the target model. 208

In response to detecting expected drift in the target model, automatically generate ensemble of replacement models using historical database of models. 210

Automatically retrain or replace the target model. 212

END

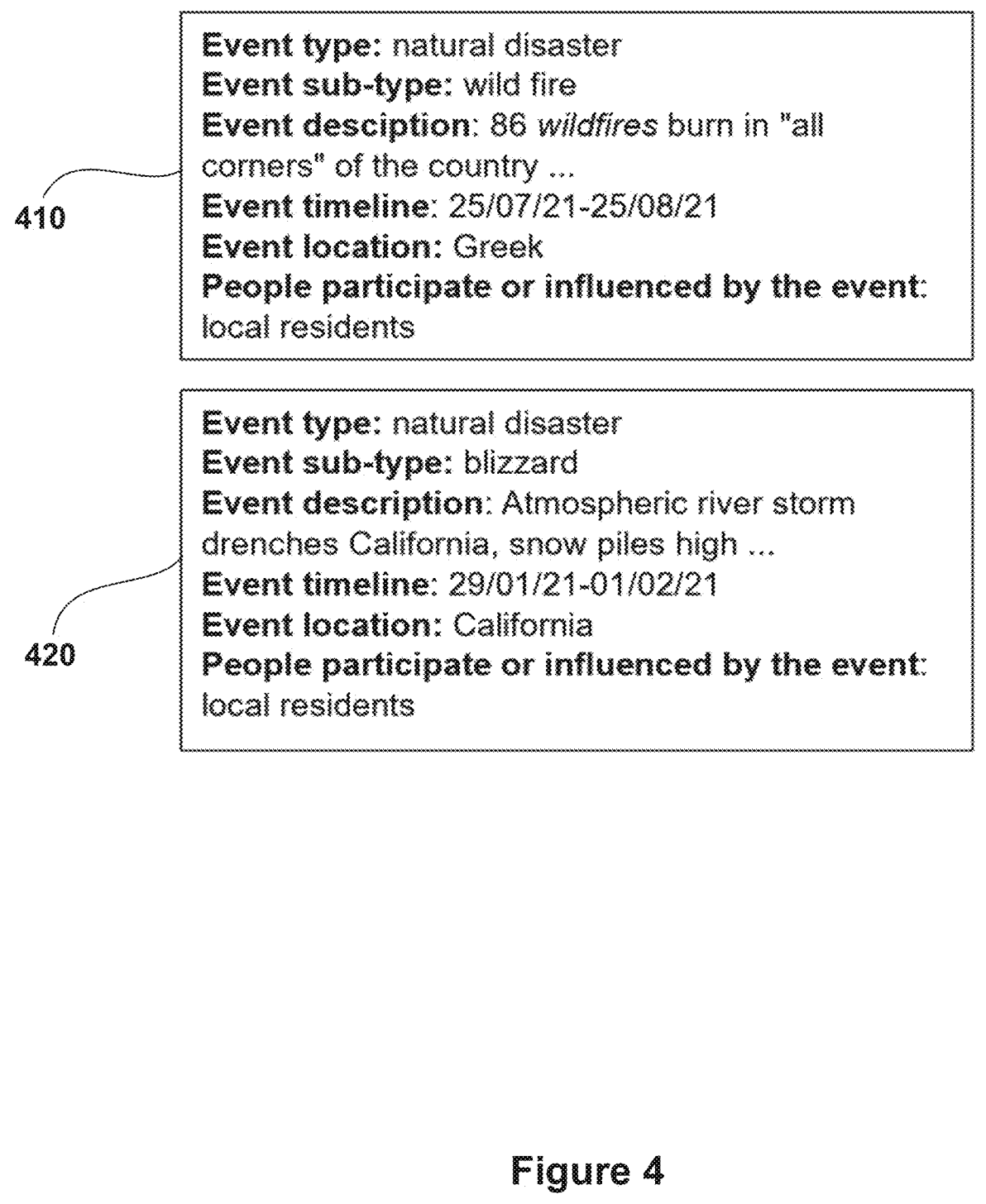

Event type: natural disaster
Event sub-type: wild fire
Event desciption: 86 *wildfires* burn in "all corners" of the country ...
Event timeline: 25/07/21-25/08/21
Event location: Greek
People participate or influenced by the event: local residents

420

Event type: natural disaster
Event sub-type: blizzard
Event description: Atmospheric river storm drenches California, snow piles high ...
Event timeline: 29/01/21-01/02/21
Event location: California
People participate or influenced by the event: local residents

Figure 4

FORECASTING AND MITIGATING CONCEPT DRIFT USING NATURAL LANGUAGE PROCESSING

BACKGROUND

The present application relates generally to computers, and more particularly, to forecasting and mitigating concept drift in machine learning models using natural language processing.

Many businesses employ machine learning models to automate and improve a variety of tasks. Over time, it is common for machine learning models to experience concept drift. Typically concept drift involves changes over time in the underlying probability distribution of input data used to train a given machine learning model. Concept drift may ultimately result in decreased accuracy of a given machine learning model's predictions.

SUMMARY

According to one embodiment, a method, computer system, and computer program product for automatically forecasting and mitigating concept drift in machine learning models using natural language processing is provided. The embodiment may include automatically detecting features and variables considered by a target machine learning model. The embodiment may also include automatically storing and updating a configurable corpus of relevant documents pertaining to a domain of the target machine learning model. The embodiment may further include automatically extracting event types and corresponding time stamps from the configurable corpus of relevant documents. The embodiment may also include automatically correlating the extracted event types with drift detection probabilities to detect expected concept drift in the target machine learning model at a given timestamp. The embodiment may further include, in response to detecting expected concept drift in the target machine learning model, automatically generating an ensemble of replacement models based on probabilities derived from a historical database of models including corresponding keys given by event types. The embodiment may also include automatically retraining or replacing the target machine learning model at the given timestamp at which the expected concept drift was detected.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment; and FIG. 2 illustrates an operational flowchart for a process of automatically forecasting and mitigating concept drift in machine learning models using natural language processing according to at least one embodiment;

FIG. 4 illustrates exemplary extracted events that may be extracted from a configurable corpus of relevant documents according to at least one embodiment;

DETAILED DESCRIPTION

Figure 3:
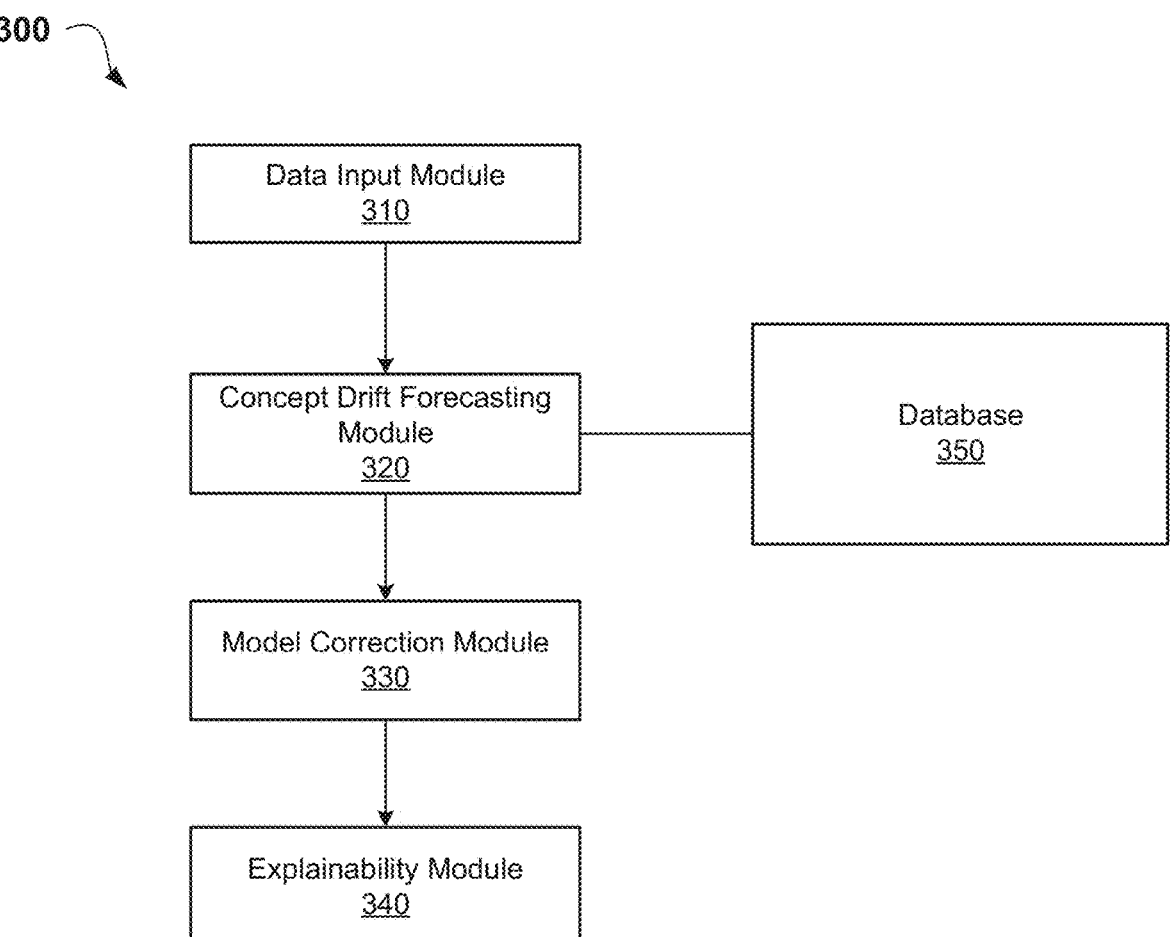
FIG. 3 illustrates exemplary system architecture that may be used in an illustrative process of automatically forecasting and mitigating concept drift in machine learning models using natural language processing according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate relates generally to machine learning, and more particularly, to forecasting and mitigating concept drift in machine learning models using natural language processing. The following described exemplary embodiments provide a system, method, and program product to, among other things, automatically detect features and variables considered by a target machine learning model, automatically store and update a configurable corpus of relevant documents pertaining to a domain of the target machine learning model, automatically extract event types and corresponding time stamps from the configurable corpus of relevant documents, and automatically correlate the extracted event types with drift detection probabilities to detect expected concept drift in the target machine learning model at a given timestamp. The described exemplary embodiments may then, in response to detecting the expected concept drift in the target machine learning model, automatically generate an ensemble of replacement models based on probabilities derived from a historical database of models including corresponding keys given by the event types, and automatically retrain or replace the target machine learning model at the given timestamp at which the expected concept drift was detected. Therefore, the presently described embodiments have the capacity to improve the ability of businesses to forecast and mitigate concept drift in machine learning models using natural language processing.

As previously described, many businesses employ machine learning models to automate and improve a variety of tasks. Over time, it is common for machine learning models to experience concept drift. Typically concept drift involves changes over time in the underlying probability distribution of input data used to train a given machine learning model. Concept drift may ultimately result in decreased accuracy of a given machine learning model's predictions.

Some methods of addressing concept drift may involve periodic retraining, online learning approaches, or retraining based on drift detection. However, often models underperform until concept drift is detected and a new model is retrained. Periodic training can be costly and does not always succeed in capturing all experienced concept drift. Online learning approaches may allow users to update models upon arrival of samples, but the process is costly, particularly when a given update occurs when it is not needed. Lastly, retraining based on drift detection presents challenges related to data availability, as the required data for retraining may not be easily obtainable.

Accordingly, a method, computer system, and computer program product for improved forecasting and mitigating of concept drift in machine learning models using natural language processing is provided. The method, system, and computer program product may automatically detect features and variables considered by a target machine learning model. The method, system, computer program product may automatically store and update a configurable corpus of relevant documents pertaining to a domain of the target machine learning model. The method, system, computer program product may automatically extract event types and corresponding time stamps from the configurable corpus of relevant documents. The method, system, computer program product may then automatically correlate the extracted event types with drift detection probabilities to detect expected concept drift in the target machine learning model at a given timestamp. Then, the method, system, computer program product may, in response to detecting the expected concept drift in the target machine learning model, automatically generate an ensemble of replacement models based on probabilities derived from a historical database of models including corresponding keys given by the event types. Thereafter, the method, system, computer program product may automatically retrain or replace the target machine learning model at the given timestamp at which the expected concept drift was detected. In turn, the method, system, computer program product has provided for improved forecasting and mitigating of concept drift in machine learning models using natural language processing. Described embodiments provide for an automated system to detect expected concept drift ahead of time. Furthermore, the described embodiments may leverage historical databases of models, including their associated features, response variables, corpuses, and other data to generate replacement models to substitute or train a target machine learning model that is expected to experience concept drift. This may allow for retraining of a target model even if there is no availability of training data including the requisite new features or labels needed to perform more conventional retraining approaches.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as concept drift mitigation program/code 150. In addition to concept drift mitigation code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and concept drift mitigation code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in concept drift mitigation code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in concept drift mitigation code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the concept drift mitigation program 150 may be a program capable of automatically detecting features and variables considered by a target machine learning model. Concept drift detection program 150 may then automatically store and update a configurable corpus of relevant documents pertaining to a domain of the target machine learning model. Next, concept drift detection program 150 may automatically extract event types and corresponding time stamps from the configurable corpus of relevant documents. Concept drift detection program 150 may then automatically correlate the extracted event types with drift detection probabilities to detect expected concept drift in the target machine learning model at a given timestamp. Next, concept drift detection program 150 may, in response to detecting the expected concept drift in the target machine learning model, automatically generate an ensemble of replacement models based on probabilities derived from a historical database of models including corresponding keys given by the event types. Thereafter, concept drift detection program 150 may automatically retrain or replace the target machine learning model at the given timestamp at which the expected concept drift was detected. Described embodiments thus provide for improved forecasting and mitigating of concept drift in machine learning models using natural language processing. Described embodiments provide for an automated system to detect expected concept drift ahead of time. Furthermore, the described embodiments may leverage historical databases of models, including their associated features, response variables, corpuses, and other data to generate replacement models and relevant data to substitute or train a target machine learning model that is expected to experience concept drift. This may allow for retraining of a target model even if there is no availability of training data including the requisite new features or labels needed to perform more conventional retraining approaches.

Referring now to FIG. 2, an operational flowchart for a process 200 of automatically forecasting and mitigating concept drift in machine learning models using natural language processing according to at least one embodiment is provided.

Illustrative embodiments capable of performing process 200 may include exemplary system architecture 300 as depicted in FIG. 3. For example, described embodiments may include an exemplary data input module 310 for gathering the variables and features considered by a target model, an exemplary concept drift forecasting module 320 for detecting expected concept drift in a target model, an exemplary model correction module 330 for performing model retraining or model substitution to mitigate expected concept drift in a target model at a given timestamp, an exemplary explainability module 340 for logging and presenting the reasoning behind an instance of expected concept drift in a target model, and a database 350 for storing historical database data and events that may be queried by the exemplary concept drift forecasting module 320. The exemplary architecture of FIG. 3 will be referenced and described in further detail below in connection with the description of process 200 in FIG. 2.

At 202, concept drift detection program 150 may automatically detect features and variables considered by a target machine learning model. In embodiments, once employed, concept drift detection program 150 may utilize an exemplary data input module 310 that is configured to perform any suitable and known model interpretability techniques to detect the features and variables considered by a target model. For example, concept drift detection program 150 may perform various model visualization techniques or determine from a target model's codebase which features and variable are considered based on logic of how the model uses the features and variables. In embodiments, concept drift detection program 150 may be configured to perform further suitable known model interpretability techniques to gather additional information about a target model's domain, weight or importance assigned to the detected features and variables using known model agnostic interpretability methods such as Local Interpretable Model-Agnostic Explanations (LIME), Shapley Additive explanations (SHAP), Anchors, counterfactuals, etc., attention weight visualization techniques, saliency map techniques, activation maximization techniques, model architecture interpretation techniques, and any other known suitable techniques for gathering data about the features and variables considered by a target machine learning model.

Next, at 204, concept drift detection program 150 may automatically store and update a configurable corpus of relevant documents pertaining to a domain of the target machine learning model. In embodiments, a user may manually provide a pre-built or publicly available corpus of relevant documents for concept drift detection program 150. In other embodiments, concept drift detection program 150 may be configured to automatically collect and update a corpus of relevant documents through various known data collection techniques. For example, concept drift detection program 150 may collect relevant documents and texts from various newspapers, magazines, government websites, and any other relevant sources that pertain to the target model's domain or considered features and variables previously detected at step 202. Concept drift detection program 150 may automatically store and update the collected corpus of relevant documents within an exemplary database 350 as it continuously obtains additional text data from appropriate sources. In embodiments, the corpus of relevant documents being stored by concept drift detection program 150 may be processed or customized via annotating, preprocessing, splitting, modifying of format, or other suitable customization tasks depending on the target model domain. Thus, concept drift detection program 150 stores and updates a configurable corpus of relevant documents that is directly pertinent to the domain of the target machine learning model.

At 206, concept drift detection program 150 automatically extract event types and corresponding time stamps from the configurable corpus of relevant documents. In embodiments, concept drift detection program 150 may, for example, utilize an event extraction model configured to extract event types and corresponding time stamps from the configurable corpus obtained at step 204 using multi-label classification techniques. In embodiments, concept drift detection program 150 may utilize any suitable natural language processing techniques to extract event types from the configurable corpus including techniques involving rule-based approaches, machine learning-based approaches such as decision trees, random forests, and support vector machines to train models to extract event types from text, semantic labeling, or suitable hybrid approaches of the aforementioned techniques. FIG. 4 illustrates exemplary extracted event types 410 and 420 that may be extracted from a configurable corpus of relevant documents according to at least one embodiment. As shown in FIG. 4, using natural language processing techniques to extract the event types allows for the gathering of a variety of useful data. For example, extracted event type 410 may include event information extracted from an article about a wildfire at a given location at a specific time (timestamp). The extracted data for extracted event type 410 may further include, for example, an event type, sub-type, description, timeline, location, and group of persons influenced by the event based upon the relevant document or text being considered.

At 208, concept drift detection program 150 may automatically correlate the extracted event types with drift detection probabilities to detect expected concept drift in the target machine learning model at a given timestamp. Concept drift detection program 150 may utilize exemplary concept drift forecasting model 320 to determine if there are extracted event types in the stored corpus of relevant documents that are likely to result in concept drift for the target machine learning model. In embodiments, concept drift detection program 150 may utilize a supervised classification model with event types as features and drift detection as target variables, or key-value pairing with event types as keys and drift detection as values, to forecast or detect drift based upon the extracted events obtained at 206. This allows concept drift detection program 150 to forecast drift in real-time even in environments where the data distribution may change over time. It also allows concept drift detection program 150 to forecast drift based upon individual features rather than a whole dataset and can be useful to identify which specific features may cause drift. This data may be stored in database 350 to improve the amount of collected and stored historical data. In embodiments, key-value pairs can be used to forecast concept drift using a variety of metrics, such as, for example, mean, standard deviation, entropy, kurtosis, skewness, etc. In embodiments, the threshold for drift forecasting or detection may be manually set at a pre-selected percentage or probability based on a user's desired level of sensitivity and can be adjusted over time as the system adapts to additional data. For example, exemplary concept drift forecasting module 320 of concept drift detection program 150 may utilize key-value pairings to determine that the data associated with extracted event 420, namely a blizzard event in California on January 28-29, has a 98 percent likelihood of causing concept drift for an exemplary target model 'Model A' designed to predict expected demand for taxi rides. If an exemplary drift detection probability threshold for exemplary 'Model A' is below 98, then concept drift detection program 150 will determine that there is expected concept drift for target 'Model A' based on extracted event 420.

Figure 5:
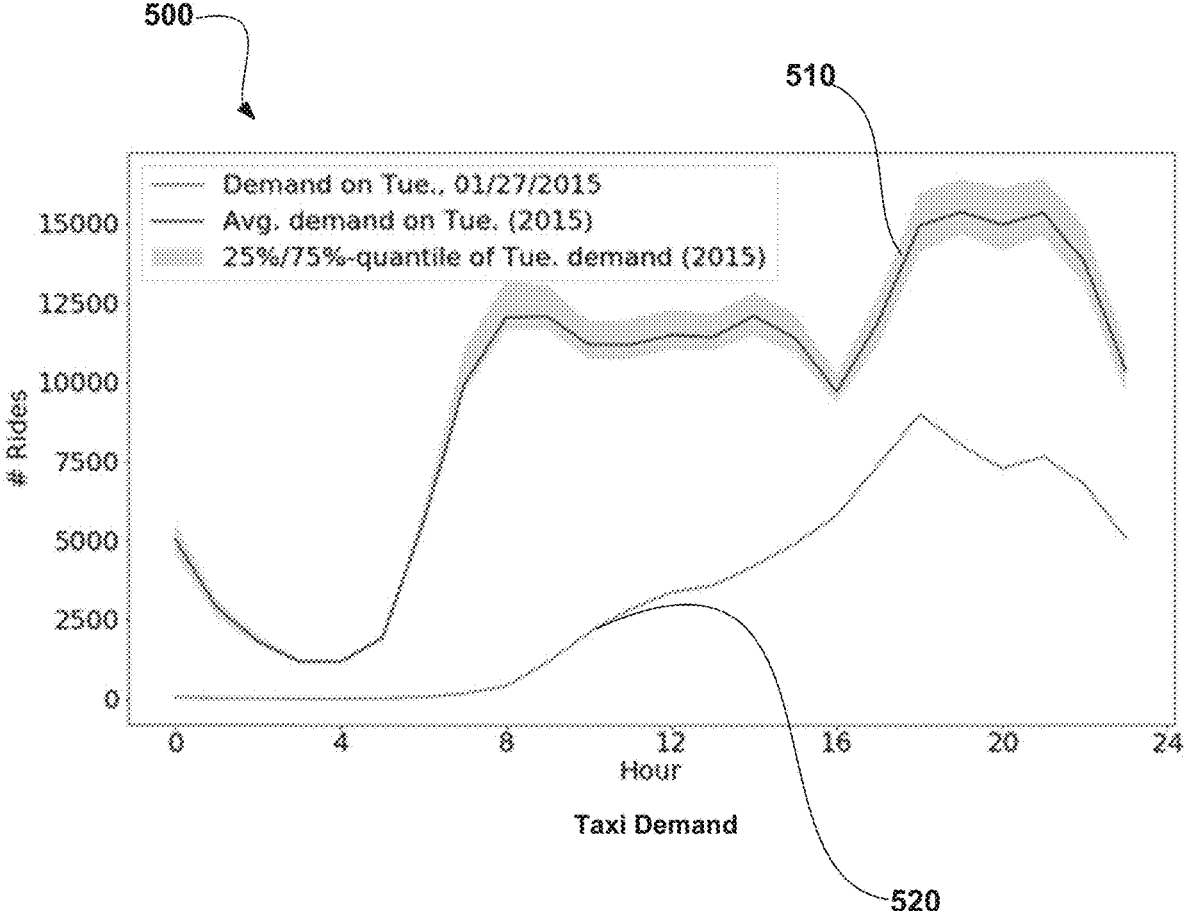
FIG. 5 illustrates an exemplary graphical depiction of an average expected hourly taxi ride demand curve for a specific date generated by an exemplary machine learning model, and a second actual hourly taxi demand curve for the specific date during which an event has occurred.

FIG. 5 may be used to further illustrate the importance of step 208 described above. FIG. 5 illustrates an exemplary graphical depiction 500 of an average expected hourly taxi ride demand curve 510 for a specific date generated by an exemplary machine learning model, and a second actual hourly taxi demand curve 520 for the specific date during which an event has occurred. The hourly taxi ride demand curve 510 generated by the exemplary machine learning model would generally be accurate for that specific date, however, as shown by the actual hourly taxi demand curve 520, the effect of a blizzard occurring that day drastically shifts the demand curve downwards, as demand for taxi rides decreases. Detecting the concept drift and adjusting the exemplary model after the prediction is already made may be too slow, time consuming, or costly. Accordingly, forecasting the expected concept drift ahead of time using the above-described techniques may allow for quicker retraining or substitution of the exemplary model to ensure that the concept drift does not lead to inaccurate predictions.

At 210, concept drift detection program 150 may, in response to detecting expected concept drift in the target machine learning model, automatically generate an ensemble of replacement models based on probabilities derived from a historical database of models including corresponding keys given by event types. At this step, exemplary model correction module 330 of concept drift detection program 150 may be configured to identify an ensemble of potential replacement models derived from models stored in exemplary database 350 that may be pertinent to the expected concept drift based on the relevant event types and corresponding keys. The event type keys allow for the categorization of different types of events in the stored data to allow for pattern detection, event correlation, and anomaly detection as it relates to concept drift for the given domain and event type. For example, at this step, exemplary model correction module 330 of concept drift detection program 150 may query exemplary database 350 to identify from a historical collection of models an ensemble of replacement models that have significant probabilities of improving the performance of the predictive accuracy of the target model.

In some instances, a new event type may be associated with forecasted or expected drift. In the context of this disclosure, a new event type is an event type for which there is no history for learning based on similar event types or models within exemplary database 350 related to the new event type. In this instance, concept drift detection program 150 may perform data collection pertaining to the new event and store the corresponding data within exemplary database 350. This process may then be repeated until the history is sufficient to allow for inferring of which model may be used to improve predictive performance upon detection of expected concept drift due to that key event. In some embodiments, concept drift detection program 150 may be manually configured to include a defined default model to be used when drift is detected for an event type for which on historical data exists.

Thereafter, at 212, concept drift detection program 150 may automatically retrain or replace the target machine learning model at the given timestamp at which the expected concept drift was detected. In embodiments, concept drift detection program 150 may utilize exemplary model correction module 430 to schedule a job to retrain or replace the target machine learning model at the timestamp where the expected concept drift was detected. Concept drift detection program may utilize a replacement model with the highest probability of improving the predictive capabilities of the target model identified at step 210.

Figure 6:
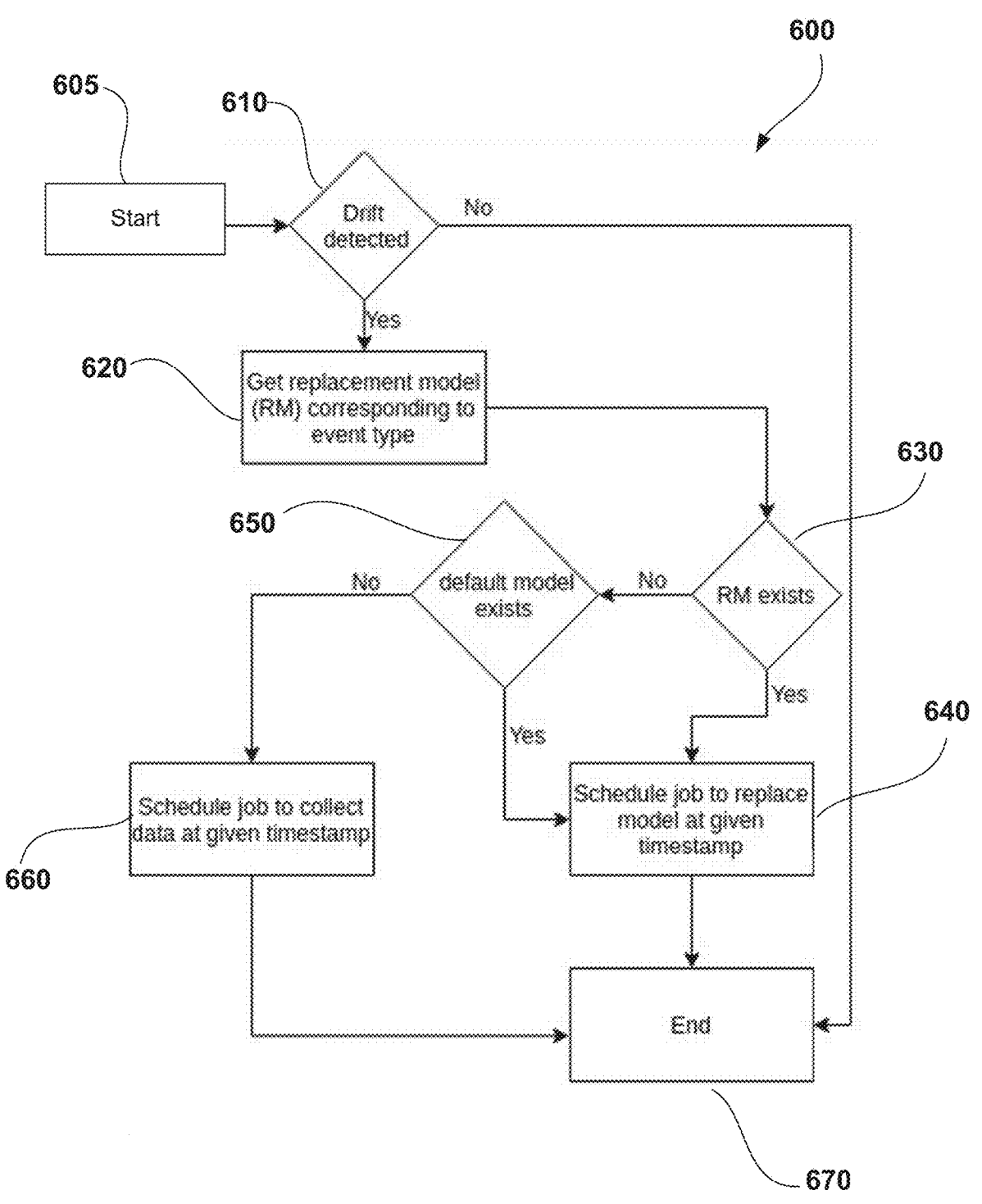
FIG. 6 illustrates an exemplary process for correcting a machine learning model for which expected concept drift has been detected according to at least one embodiment.

Concept drift detection program 150 may include a process for correcting a target model for which expected concept drift has been detected as illustrated in process 600 shown in the flow chart depicted in FIG. 6. Illustrative process 600 starts at 605. At 610, concept drift detection program 150 detects if there is expected concept drift. If there is no drift detected, the process ends at 670. At 620, if expected concept drift is detected, concept drift detection program 150 will attempt to identify and obtain a replacement model (sometimes abbreviated as 'RM') corresponding to the event type correlated to the expected concept drift. If a relevant replacement model 630 exists within the accessible collection of stored models and historical data, concept drift detection program 150 may schedule a job to replace the model at the time stamp corresponding to the expected drift at 640. If there is no relevant replacement model present within collection of deployed models and historical data, then concept drift detection program 150 may check for a default model at 650 with which to replace the target model and subsequently schedule model replacement and correction at 640 in a similar manner. However, if there is no default model, then concept drift detection program 150 may schedule a job to collect data at the given time stamp corresponding to the expected concept drift at 660.

In embodiments, once the RM is deployed, it may be used for scoring and, optionally, the performance of the model may be assessed through the residuals to infer the performance of the model. After several scoring iterations and sufficient labels are available, if the performance of the RM is not very high, a new model reflective of the actual situation may be determined irrespective of the presence of concept drift.

In embodiments, concept drift detection program 150 may further be configured to utilize an exemplary explainability module 340 to output to an end user explainability statements including reasons for why the forecasted concept drift is likely to be experienced. This may be presented to an end user using any suitable user interface.

It will be appreciated that concept drift detection program 150 thus provides for improved forecasting and mitigating of concept drift in machine learning models using natural language processing. Described embodiments provide for an automated system to detect expected concept drift before it occurs. Furthermore, the described embodiments may leverage historical databases of models, including their associated features, response variables, corpuses, and other data to generate replacement models and relevant data to substitute or train a target machine learning model that is expected to experience concept drift. This may allow for retraining of a target model even if there is no availability of training data including the requisite new features or labels needed to perform more conventional retraining approaches.

It may be appreciated that FIG. 2 provides only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of automatically forecasting and mitigating concept drift in machine learning models using natural language processing comprising:

automatically detecting features and variables considered by a target machine learning model, wherein concept drift detection includes one or more of Local Interpretable Model-Agnostic Explanations (LIME), and Shapley Additive ex-Planations (SHAP);

automatically storing and updating a configurable corpus of relevant documents pertaining to a domain of the target machine learning model, wherein the storing and updating includes processing by annotating, splitting, and modifying of format, based on the domain of the target machine learning model;

automatically extracting event types and corresponding time stamps from the configurable corpus of relevant documents, by natural language processing techniques, including rule-based, decision tree, random forests, support vector machines, and semantic labeling;

automatically correlating the extracted event types with drift detection probabilities to detect expected concept drift in the target machine learning model at a given timestamp, by a supervised classification model with event types as features and drift detection as target variables to forecast drift in real-time;

in response to detecting the expected concept drift in the target machine learning model, automatically generating an ensemble of replacement models based on probabilities derived from a historical database of models including corresponding keys given by the event types; and automatically retraining or replacing the target machine learning model at the given timestamp at which the expected concept drift was detected.

2. The computer-based method of claim 1, wherein automatically extracting the event types and the corresponding time stamps from the configurable corpus of relevant documents further comprises:

automatically using one or more of multi-label classification techniques, semantic role labeling, and machine learning algorithms.

3. The computer-based method of claim 1, wherein automatically correlating the extracted event types with the drift detection probabilities to detect the expected concept drift in the target machine learning model at the given timestamp further comprises:

automatically determining the extracted event types corresponding to the drift detection probabilities that have values above a preconfigured threshold for identifying expected concept drift.

4. The computer-based method of claim 1, wherein automatically correlating the extracted event types with the drift detection probabilities to detect the expected concept drift in the target machine learning model at the given timestamp further comprises:

utilizing at least one supervised classification model with the event types as features and drift detection as target variables, or key-value pairs with the event types as keys and drift detection as values to detect the expected concept drift.

5. The computer-based method of claim 1, wherein automatically retraining or replacing the target machine learning model at the given timestamp at which the expected concept drift was detected further comprises:

replacing the target machine learning model with a default replacement model.

6. The computer-based method of claim 1, further comprising:

automatically detecting a new event type; and in response to detecting the new event type, automatically collecting new event type data at a given timestamp corresponding to the new event type and storing the data in a database.

7. The computer-based method of claim 1, further comprising:

automatically outputting to a user an explainability statement including reasons for the detected expected concept drift.

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

automatically detecting features and variables considered by a target machine learning model, wherein concept drift detection includes one or more of Local Interpretable Model-Agnostic Explanations (LIME), and Shapley Additive ex-Planations (SHAP);

automatically storing and updating a configurable corpus of relevant documents pertaining to a domain of the target machine learning model, wherein the storing and updating includes processing by annotating, splitting, and modifying of format, based on the domain of the target machine learning model;

automatically extracting event types and corresponding time stamps from the configurable corpus of relevant documents, by natural language processing techniques, including rule-based, decision tree, random forests, support vector machines, and semantic labeling;

automatically correlating the extracted event types with drift detection probabilities to detect expected concept drift in the target machine learning model at a given timestamp, by a supervised classification model with event types as features and drift detection as target variables to forecast drift in real-time;

in response to detecting the expected concept drift in the target machine learning model, automatically generating an ensemble of replacement models based on probabilities derived from a historical database of models including corresponding keys given by the event types; and automatically retraining or replacing the target machine learning model at the given timestamp at which the expected concept drift was detected.

9. The computer system of claim 8, wherein automatically extracting the event types and the corresponding time stamps from the configurable corpus of relevant documents further comprises:

automatically using one or more of multi-label classification techniques, semantic role labeling, and machine learning algorithms.

10. The computer system of claim 8, wherein automatically correlating the extracted event types with the drift detection probabilities to detect the expected concept drift in the target machine learning model at the given timestamp further comprises:

automatically determining the extracted event types corresponding to the drift detection probabilities that have values above a preconfigured threshold for identifying expected concept drift.

11. The computer system of claim 8, wherein automatically correlating the extracted event types with the drift detection probabilities to detect the expected concept drift in the target machine learning model at the given timestamp further comprises:

utilizing at least one supervised classification model with the event types as features and drift detection as target variables, or key-value pairs with the event types as keys and drift detection as values to detect the expected concept drift.

12. The computer system of claim 8, wherein automatically retraining or replacing the target machine learning model at the given timestamp at which the expected concept drift was detected further comprises:

replacing the target machine learning model with a default replacement model.

13. The computer system of claim 8, further comprising:

automatically detecting a new event type; and in response to detecting the new event type, automatically collecting new event type data at a given timestamp corresponding to the new event type and storing the data in a database.

14. The computer system of claim 8, further comprising:

automatically outputting to a user an explainability statement including reasons for the detected expected concept drift.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

automatically detecting features and variables considered by a target machine learning model, wherein concept drift detection includes one or more of Local Interpretable Model-Agnostic Explanations (LIME), and Shapley Additive ex-Planations (SHAP);

automatically storing and updating a configurable corpus of relevant documents pertaining to a domain of the target machine learning model, wherein the storing and updating includes processing by annotating, splitting, and modifying of format, based on the domain of the target machine learning model;

automatically extracting event types and corresponding time stamps from the configurable corpus of relevant documents, by natural language processing techniques, including rule-based, decision tree, random forests, support vector machines, and semantic labeling;

automatically correlating the extracted event types with drift detection probabilities to detect expected concept drift in the target machine learning model at a given timestamp, by a supervised classification model with event types as features and drift detection as target variables to forecast drift in real-time;

in response to detecting the expected concept drift in the target machine learning model, automatically generating an ensemble of replacement models based on probabilities derived from a historical database of models including corresponding keys given by the event types; and automatically retraining or replacing the target machine learning model at the given timestamp at which the expected concept drift was detected.

16. The computer program product of claim 15, wherein automatically extracting the event types and the corresponding time stamps from the configurable corpus of relevant documents further comprises:

automatically using one or more of multi-label classification techniques, semantic role labeling, and machine learning algorithms.

17. The computer program product of claim 15, wherein automatically correlating the extracted event types with the drift detection probabilities to detect the expected concept drift in the target machine learning model at the given timestamp further comprises:

automatically determining the extracted event types corresponding to the drift detection probabilities that have values above a preconfigured threshold for identifying expected concept drift.

18. The computer program product of claim 15, wherein automatically correlating the extracted event types with the drift detection probabilities to detect the expected concept drift in the target machine learning model at the given timestamp further comprises:

utilizing at least one supervised classification model with the event types as features and drift detection as target variables, or key-value pairs with the event types as keys and drift detection as values to detect the expected concept drift.

19. The computer program product of claim 15, wherein automatically retraining or replacing the target machine learning model at the given timestamp at which the expected concept drift was detected further comprises:

replacing the target machine learning model with a default replacement model.

20. The computer program product of claim 15, further comprising:

automatically detecting a new event type; and in response to detecting the new event type, automatically collecting new event type data at a given timestamp corresponding to the new event type and storing the data in a database.

* * * * *